United States Patent [19]

Shimanuki et al.

[11] 4,428,416
[45] Jan. 31, 1984

[54] METHOD OF MANUFACTURING A MULTI-LAYER AMORPHOUS ALLOY

[75] Inventors: Senji Shimanuki; Koichiro Inomata, both of Kawasaki, Japan

[73] Assignee: Tokyo Shibaura Denki Kabushiki Kaisha, Kanagawa, Japan

[21] Appl. No.: 505,121

[22] PCT Filed: Apr. 21, 1980

[86] PCT No.: PCT/JP80/00080
§ 371 Date: Dec. 8, 1980
§ 102(e) Date: Dec. 8, 1980

[87] PCT Pub. No.: WO80/02242
PCT Pub. Date: Oct. 30, 1980

Related U.S. Application Data

[63] Continuation of Ser. No. 220,032, Dec. 8, 1980, abandoned.

[30] Foreign Application Priority Data

Apr. 20, 1979 [JP] Japan ................................ 54-52100

[51] Int. Cl.³ ............................................ B22D 11/06
[52] U.S. Cl. ...................... 164/461; 164/463; 164/479; 164/480
[58] Field of Search ............................ 164/461–463, 164/480, 479, 423, 427–429, 432–434, 481–482

[56] References Cited

U.S. PATENT DOCUMENTS 1,956,467 4/1934 Palm .............................. 164/461 X
3,670,400 6/1972 Singer ............................ 164/480 X
4,190,095 2/1980 Bedell ............................... 164/463

FOREIGN PATENT DOCUMENTS 5453501 9/1952 Japan .
53-106634 9/1978 Japan .
15548 of 1914 United Kingdom ................ 164/429

OTHER PUBLICATIONS

PCT/55PCT317 dated 4/12/80.

Primary Examiner—Kuang Y. Lin
Attorney, Agent, or Firm—Oblon, Fisher, Spivak, McClelland & Maier

[57] ABSTRACT

A method for manufacturing a multi-layer amorphous alloy having at least one layer of amorphous alloy, comprises the steps of ejecting a first molten metal on one of a pair of rollers rotating at a high speed, and rotating the ejected metal with the roller in a shape of a layer for rapid cooling; forming two molten metal layers on the rotating roller or belt by ejecting a second molten metal different from the first metal on the first molten metal for rapid cooling; and adhering under pressure and rolling the molten metal layers between the pair of rollers; and the method of the present invention is applicable to the manufacture of multi-layer alloys which may be used as various composite alloy materials such as high-sensitivity bimetals, superconductive wires, contact spring composite alloys, latching relays having two-stepped magnetic hysteresis, and high fidelty magnetic heads.

4 Claims, 3 Drawing Figures

METHOD OF MANUFACTURING A MULTI-LAYER AMORPHOUS ALLOY

This application is a Continuation of application Ser. No. 220,032, filed Dec. 8, 1980, now abandoned.

TECHNICAL FIELD

The present invention relates to a method for manufacturing a multi-layer alloy consisting of a laminated body of different kinds of metals or alloys thereof and, more particularly, to a method for manufacturing a multi-layer amorphous alloy having at least one amorphous alloy layer.

BACKGROUND ART

Various multi-layer alloys for laminated bodies of different metals (to include alloys hereinafter) are known in various fields, for such applications as bimetals with two metals having different heat expansion ratios; cladding material consisting of beryllium copper which is excellent in mechanical strength, and a layer of a noble metal which is excellent in contact characteristics; magnetic wires consisting of beryllium copper and Permalloy (trade name); superconductive wires consisting of copper and a superconductive body; composite magnetic materials used in electronic switching machines; leads used in self-holding type lead switches and so on.

Recently, amorphous alloys obtained by rapidly cooling molten metal are receiving a lot of attention due to their particular electromagnetic and mechanical characteristics, and the application of such amorphous alloys in multi-layer alloys has been desired.

However, since conventional multi-layer alloys are manufactured by adhering two different kinds of metals by heating or pressing, electrodeposition, vacuum evaporation, plating, welding and so on, the process has been complex. Furthermore, the manufacture of a multi-layer alloy including an amorphous alloy has involved the problem that adhering by heating cannot be performed. Thus, an effective, practical means for manufacturing a multi-layer alloy including an amorphous alloy has not been discovered yet.

A method has recently been proposed according to which different kinds of molten metals are ejected on each of a pair of revolving rollers, and they are joined and adhered by the rollers for manufacturing a multi-layer amorphous alloy. However, according to this method, the distance between the nozzles for ejecting the two different kinds of metals must be made extremely small, obstructing the design, limiting the adhering conditions, and providing an impractical solution to the problem. Further, the joining of the two metal layers is performed only between a pair of rollers, so that the adhering time is short and the adhesion between the obtained layers of the multi-layer alloy is disadvantageously low.

The present invention has been made in consideration of this and has for its object to provide a method for manufacturing a multi-layer amorphous alloy in which the adhesion is improved, the feeding positions of the molten metals can be freely chosen without any problems, and at least one layer of amorphous alloy is included.

DISCLOSURE OF INVENTION

The present invention provides a method for manufacturing a multi-layer amorphous alloy having at least one layer of amorphous alloy, comprising the steps of ejecting a first molten metal on one of a pair of rollers rotating at a high speed or on a metal belt driven by the roller, and rotating the ejected metal with the rollers for rapid cooling; forming two molten metal layers on the rotating roller or belt by ejecting a second molten metal different from said first metal on said first molten metal for rapid cooling; and adhering under pressure and rolling said molten metal layers between said pair of rollers.

BEST MODE OF CARRYING OUT THE INVENTION

The present invention will now be described in more detail with reference to the accompanying drawings.

Figure 1:
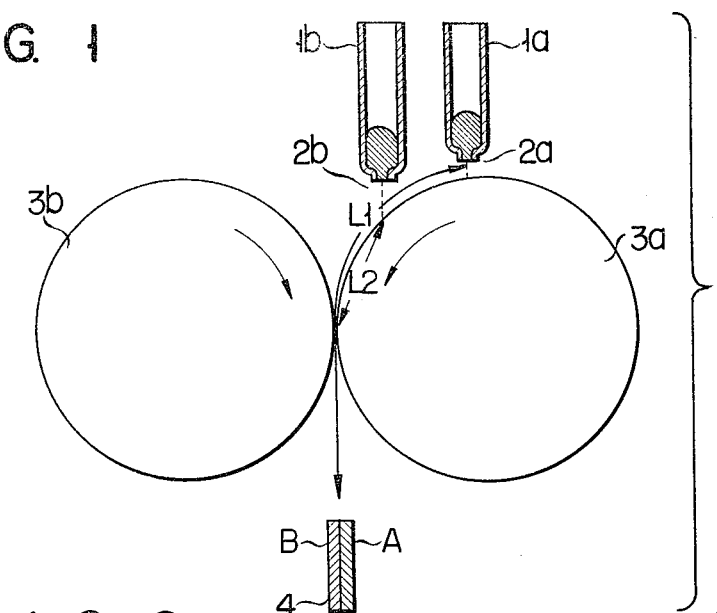
FIG. 1 is a partial sectional view schematically illustrating a device for manufacturing a multi-layer amorphous alloy used in one embodiment of the present invention.

A device for carrying out the method of the present invention is shown in FIG. 1. Referring to FIG. 1, a first nozzle 2a and a second nozzle 2b are disposed at the lower ends of a first tubular container 1a and a second tubular container 1b of quartz glass tubes, respectively, for example, for holding two different kinds of raw material metals A and B melted by high frequency induction melting. Below these first and second nozzles 2a and 2b are disposed a first roller 3a paired with a second roller 3b. The molten metal A melted by the first tubular container 1a is ejected through the first nozzle 2a onto the first roller 3a by the pressure of an inert gas. The ejected molten metal A is rapidly cooled by contacting the first roller 3a rotating at a high speed and forms a lower layer consisting of amorphous metal A. Subsequently, the molten metal B melted by the second tubular container 1b is ejected on the lower layer of the amorphous metal A through the second nozzle 2a to form an upper layer of amorphous metal B. The two layers of metals thus laminated are rapidly cooled and rolled between the first roller 3a and the second roller 3b to provide a two-layer amorphous alloy 4 of excellent adhesion. Although the lower layer was a layer of an amorphous metal, it may alternatively be a crystalline metal layer.

For obtaining a multi-layer alloy of good quality, the upper and lower layers must not mix with each other. In order to make sure that the upper and lower layers do not mix with each other, the temperature $T_1$ of the lower layer of the amorphous metal A when the molten metal B of the upper layer is ejected on it must satisfy inequality (1) or (2) described below:

1. When the metal of the lower layer is an amorphous metal:

$$Tx < T_1 < Ts \qquad (1)$$

Tx: crystallizing temperature (°C)
Ts: solidifying temperature (°C)

When $T_1$ is higher than Ts, the lower layer metal A and the upper layer metal B mix together. When $T_1$ is lower than Tx, the lower layer metal becomes crystalline by contacting the molten metal B constituting the upper layer. The solidifying temperature Ts changes according to the cooling speed and is generally within the range shown below with respect to the cooling speed enabling amorphous:

$$Tm - 150° C. < Ts < Tm - 50° C.$$

where Tm is the melting point (°C).

$T_1$ is preferably in the range of $\frac{2}{3} Tm \leq T_1 < Ts$, and more preferably in the range of $Ts - 100° C. < T_1 < Ts$ (Tm of the alloy composition for obtaining an amorphous alloy is generally over 800° C. and $\frac{2}{3}Tm > Tx$).

2. When the lower layer metal is a crystalline metal:

$$\tfrac{2}{3}Tm < T_1 < Ts \qquad (2)$$

where Tm is the melting point of the lower layer metal.

When $T_1$ is higher than Ts, the lower layer metal A and the upper layer metal B mix together. When $T_1$ is lower than $\frac{2}{3}$Tm, the lower layer metal completely solidifies so that good adhesion may not be achieved.

Although $T_1$ is lower than Ts in both the cases described above, a multi-layer alloy of greater adhesion may be obtained when $T_1$ is as close to Ts as possible.

In order to cool and roll the two layers and to obtain a multi-layer alloy of great adhesion, the temperature $T_2$ of the upper layer at the contact point between the first roller 3a and the second roller 3b must satisfy the following inequality:

$$\tfrac{2}{3}Tm < T_2 < Tm \qquad (3)$$

When $T_2$ is higher than Tm or lower than $\frac{2}{3}$Tm, cooling and adhesion of the two layers may not be performed well.

The above-mentioned $T_1$ and $T_2$ may be calculated according to the Newton cooling equation as shown below:

$$T = T_B + (T_A - T_B)e^{-\frac{ht}{\rho C_p d}}$$

where
- $T_B$: roller temperature (°C)
- $T_A$: temperature of molten metal (°C)
- h: coefficient of heat transfer between the rollers and the ejected metal
- t: cooling time
- ρ: density of the ejected metal
- Cp: specific heat of the ejected metal
- d: thickness of the metal layers before rolling For determining the actual operating conditions, the times for ejecting the lower layer metal A and the upper layer metal B from the nozzles are determined from the above-mentioned temperature conditions, and the locations for ejecting the lower layer metal A and the upper layer metal B on the respective rollers are determined from each time.

While determining these conditions, the rotating speed of the rollers, the diameter of the rollers, the pressure of the introduced gas, the diameter of the nozzles, the kinds of the raw material metals and so on must be considered. The ejecting location is defined by the length L of the arc from the contact point between the rollers. When the time the ejected molten metal reaches the contact point between the rollers is defined as t, the ejecting location L may be represented as follows:

$$L = \frac{\pi D N t}{60}$$

where
- N: rotating speed of the rollers (RPM)
- D: diameter of the rollers
- t: time after ejecting With the method described above, the temperature of the molten metal A ejected from the first nozzle 2a is lower than the solidifying temperature, but before complete solidification occurs, the molten metal B is ejected from the nozzle 2b. Before the molten metal B completely solidifies, the metal layers are rolled. Thus, the respective molten metals A and B do not mix together between the two layers, so that a multi-layer amorphous alloy which is not mixed but sufficiently dispersed and greatly improved in adhesion may be obtained.

With the method and device as described above, the error in the positioning between the metal layers may be easily prevented.

Figure 2:
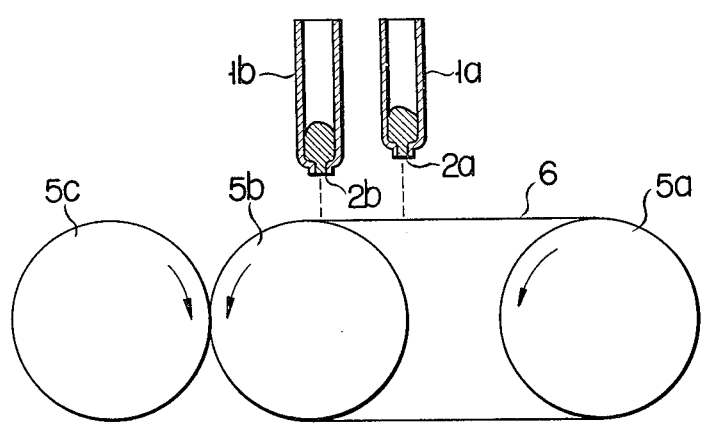
FIGS. 2 and 3 are partial sectional views schematically illustrating a device for manufacturing a multi-layer amorphous alloy used in another embodiment of the present invention.

In the above example, a device was used in which the molten metals A and B were supplied to one of the rollers 3a and 3b, i.e., roller 3a. However, as shown in FIG. 2, a device may alternatively be used in which a metal belt 6 is driven by a pair of rotary rollers 5a and 5b, the same tubular containers 1a and 1b as those of the device shown in FIG. 1 are disposed above the metal belt 6, and the molten metals are ejected from the nozzles 2a and 2b to be rolled and adhered between the belt 6 and a rolling roller 5c. With this device, the roller diameter may be made smaller for ejecting the molten metal on the metal belt 6 so that the distance between the tubular containers 1a and 1b may be sufficient and the arrangement of these containers may become easy. Thus, the arrangement of the nozzles perpendicular to the belt which is the cooling body becomes easy, contact between the molten metals and the cooling body becomes good, and the cooling efficiency is improved so that the manufacture of the multi-layer alloy including amorphous metal becomes easy.

The present invention will now be described in more detail with reference to its examples.

Example 1

A multi-layer amorphous alloy was manufactured with a device as shown in FIG. 1. The first tubular container 1a and the second tubular container 1b held 10 g each of $Co_{75}Si_{10}B_{15}$ and $Ni_{75}Si_{10}B_{15}$ respectively, prepared in advance by high frequency induction melting. The containers were located at $L_1 = 70$ mm and $L_2 = 40$ mm circumferentially away from the contact point of the pair of rollers 3a and 3b. After melting both alloys by high frequency induction furnaces, molten alloys $Co_{75}Si_{10}B_{15}$ at 1,200° C. and $Ni_{75}Si_{10}B_{15}$ at 1,100° C. were simultaneously ejected on the points of the roller 3a corresponding to $L_1 = 70$ mm and $L_2 = 40$ mm from the first nozzle 2a and the second nozzle 2b, respectively, (the nozzle diameter was 0.4 mm in each case) with argon gas at 0.5 atm. The alloys were rolled and rapidly cooled by the rollers 3a and 3b (200 mm diameter) rotating at a high speed of 2,500 rpm. As a result, a ribbon-shaped alloy strip of 1.4 width and 70 μm thickness was obtained.

This alloy strip was embedded in a cylinder of epoxy resin 1 inch in diameter and was polished as a mirror surface. The joined surface was analyzed with an X-ray microanalyzer. The $Co_{75}Si_{10}B_{15}$ alloy and the $Ni_{75}Si_{10}B_{15}$ alloy were divided with a sharp boundary in the direction of the thickness. Thus, the ribbon-shaped alloy strip was found to consist of two layers of different alloys. Both surfaces of the ribbon-shaped alloy strip were examined by X-ray diffractiometry, and they were both found to be amorphous.

A sample of 30 mm in length was cut from the above-mentioned ribbon-shaped alloy strip and a bending test of 180 degrees was performed. No separation was observed.

In this example, the temperature on the roller $3a$ corresponding to $L_2=40$ mm, that is the point where the $Ni_{75}Si_{10}B_{15}$ alloy and the $Co_{75}Si_{10}B_{15}$ alloy overlapped, was 1,000° C. This was higher than the crystallizing temperature of 520° C. and lower than the solidifying temperature of 1,050° C. The temperature of the $Ni_{75}Si_{10}B_{15}$ alloy at the contact point between the rollers $3a$ and $3b$ was 900° C. This was higher than $\frac{2}{3}$ of the melting point, or 700° C., and was lower than the melting point of 1,000° C.

Example 2

A ribbon-shaped alloy strip of 1.3 mm width and 60 μm thickness was manufactured in the same manner as in Example 1, except that the molten $Pd_{83.5}Si_{16.5}$ alloy at 1,000° C. and the molten $Fe_{75}Si_{10}B_{10}$ alloy at 1,200° C. were injected at the positions on the roller $3a$ corresponding to $L_2=50$ mm and $L_1=65$ mm. The section of the ribbon-shaped alloy strip was analyzed with an X-ray microanalyzer in a similar manner as in Example 1. The joined surface between the $Pd_{83.5}Si_{16.5}$ layer and the $Fe_{75}Si_{10}B_{15}$ layer was sharp. The X-ray diffractiometry revealed that the two amorphous metal layers in the direction of the thickness were present. The separation test was performed as in the Example 1, and no separation was observed in a bending test of 180 degrees.

The temperature of the $Fe_{75}Si_{10}B_{10}$ alloy on the point of the roller $3a$ corresponding to $L_2=50$ mm, that is, where the $Pd_{83.5}Si_{16.5}$ alloy and the $Fe_{75}Si_{10}B_{15}$ overlapped, was 950° C. This was higher than the crystallizing temperature of 540° C. and was lower than the solidifying temperature of 1,100° C. The temperature of the $Pd_{83.5}Si_{16.5}$ alloy at the contact point between the rollers $3a$ and $3b$ was 750° C. This was higher than $\frac{2}{3}$ of the melting point, or 500° C., and was lower than the melting point of 850° C.

Example 3

This example is the case wherein the two layer amorphous alloy consists of an amorphous alloy (upper layer) and a crystalline alloy (lower layer).

A ribbon-shaped alloy strip was manufactured in a manner similar to Example 1 by ejecting molten Permalloy $Fe_{55}Ni_{45}$ at 1,500° C. and the molten alloy $Pd_{80}Si_{20}$ at 1,000° C. at the positions of the roller $3a$ corresponding to $L_1=80$ mm and $L_2=50$ mm. The size of the nozzles $2a$ and $2b$ was $12\times0.5$ mm², the pressure of argon gas was 0.4 atm, and the rotational speed of the rollers $3a$ and $3b$ was 3,000 rpm. The obtained ribbon-shaped alloy strip was about 12 mm in width and about 55 μm in thickness. When the boundary between the layers was examined with an X-ray microanalyzer, the layers of Permalloy and $Pd_{80}Si_{20}$ were found to be distinct at the boundary, and the ribbon-shaped alloy strip was found to consist of two different kinds of metals. X-ray diffractiometry revealed that $Pd_{80}Si_{20}$ was amorphous and Permalloy was crystalline. The separation test was performed as in Example 1, and no separation was observed in a bending test of 180 degrees.

In this embodiment, the temperature of the Permalloy at the point on the roller $3a$ corresponding to $L_2=50$ mm, that is, where the $Pd_{80}Si_{20}$ alloy and the Permalloy overlapped, was 1,200° C. This was higher than $\frac{2}{3}$ of the melting point, or 930° C., and was lower than the solidifying point of 1,350° C. The temperature of the $Pd_{80}Si_{20}$ alloy at the contact point between the rollers $3a$ and $3b$ was 750° C. This was higher than $\frac{2}{3}$ of the melting point, or 500° C., and was lower than the melting point of 850° C.

Comparative Example

A ribbon-shaped alloy strip of 1.2 mm width and 82 μm thickness was manufactured in a manner similar to Example 1 except that the molten $Ni_{75}Si_{10}B_{15}$ alloy was ejected on the point of the roller $3a$ corresponding to $L_1=70$ mm and the molten $Co_{75}Si_{10}B_{15}$ alloy was ejected on the point of the roller $3b$ corresponding to a distance $L_2=40$ mm along the circumferential direction of the roller $3b$ measured from the contact point between the two rollers. This alloy was examined with an X-ray microanalyzer and the layers was found to be separated. The alloys easily separated when a bending test of 180 degrees was performed.

As has been described, with the method of the present invention, it is easy to manufacture a multi-layer alloy which has at least one layer of amorphous alloy and which is especially strong in adhesion.

With the method of the present invention, more than three nozzles may be disposed above one of the pair of rollers for manufacturing a multi-layer alloy of three layers or more.

Further, only one of the rollers $3a$ and $3b$ shown in FIG. 1, that is, with a single roller method, or rollers $5a$ and $5b$ as shown in FIG. 2 with a belt wound thereon may be utilized for obtaining a multi-layer alloy with one layer being amorphous. Although the adhesion is weaker in this case than that obtained with the examples described above, it is significantly stronger than that obtained with the method of the comparative example. Further, since these methods do not involve rolling with rollers, the abrasion of the rollers need not be considered, resulting in decreased cost. The example of such method will now be described.

Example 4

Figure 3:
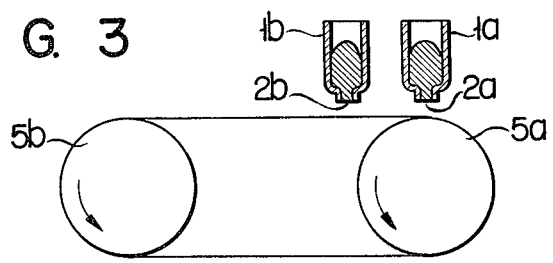

This example is the case wherein a two layer alloy consisting of amorphous metals is manufactured by a single roller method. In the device shown in FIG. 2, the gap between the roller $5b$ with a belt (Be-Cu) wound thereon and the roller $5c$ with no belt wound thereon was set to be great, and only the rollers $5a$ and $5b$ with the belt wound thereon were used for the manufacture. (FIG. 3)

The molten $Pd_{83.5}Si_{16.5}$ alloy at 1,000° C. and the molten $Fe_{75}Si_{10}B_{15}$ alloy at 1,200° C. were ejected on the belt at positions corresponding to immediately above the roller $5a$ and 20 mm away from it, respectively. The amount of the molten alloys ejected was 10 g in each case. The gas pressure was 0.5 atm. The nozzle diameter was 0.4 mm and the roller diameter was 100 mm. The rotational speed of the rollers was 3,000 rpm.

The shape of the obtained thin strip was that of a ribbon of 1.3 mm width and 70 μm thickness. The section of the ribbon-shaped alloy strip was analyzed with an X-ray microanalyzer in a manner similar to Example 1. The boundary between the $Pd_{83.5}Si_{16.5}$ layer and the $Fe_{75}Si_{10}B_{15}$ layer was sharp, and the alloys were found to be composite alloys of two layers. Both surfaces of the ribbon-shaped alloy strip were examined by X-ray diffractiometry and both were found to be amorphous. The separation test was performed with a bending test of 180 degrees in a manner similar to Example 1. The boundary was slightly separated. However, no separation was observed when it was wound on a rod of 5 mm diameter. Thus, it was found that the composite alloy presents no problems in actual use. The temperature of the $Fe_{75}Si_{10}B_{15}$ alloy at the point where the $Pd_{83.5}Si_{16.5}$ alloy and the $Fe_{75}Si_{10}B_{15}$ overlapped was 950° C. in this embodiment. This was higher than the crystallizing temperature (540° C.) and was lower than the solidifying temperature (1,100° C.).

Industrial Applicability

The method of the present invention for manufacturing a multi-layer alloy having at least one amorphous layer is applicable to the manufacture of various composite alloy materials such as high-sensitivity bimetals, superconductive wires, contact spring composite alloys, latching relays having two-stepped magnetic hysteresis, and high fidelty magnetic heads.

What is claimed is:

1. A method for manufacturing a multi-layer amorphous alloy having two layers of amorphous alloy, comprising the steps of
   ejecting a molten first metal on one of a pair of rollers rotating at a high speed or on a metal belt driven by the roller, and rotating the ejected metal with the rollers for rapid cooling;
   forming two metal layers on the rotating roller or belt by ejecting a molten second metal different from said first metal on said first metal for rapid cooling; and
   adhering said metal layers to one another under pressure and rolling between said pair of rollers;
   wherein the temperature of said first metal, when said molten second metal is ejected on said first metal, is higher than the crystallizing temperature of said first metal and lower than the solidifying temperature of said first metal.

2. The method according to claim 1, wherein the solidifying temperature of said first metal is higher than the melting point of said first metal minus 150° C. and lower than the melting point of said first metal minus 50° C.

3. The method according to claim 1, wherein the temperature of said second metal at the contact point between said pair of rollers is higher than $\frac{2}{3}$ of the melting point of said first metal and lower than the melting point of said first metal.

4. A method for manufacturing a multi-layer amorphous alloy having one layer of amorphous alloy and one layer of crystalline alloy, comprising the steps of
   ejecting a molten first metal on one of a pair of rollers rotating at a high speed or on a metal belt driven by the roller, and rotating the ejected metal with the rollers for rapid cooling;
   forming two metal layers on the rotating roller or belt by ejecting a molten second metal different from said first metal on said first metal for rapid cooling; and
   adhering said metal layers to one another under pressure and rolling between said pair of rollers;
   wherein the temperature of said first metal, when said second metal is ejected on said first metal, is higher than $\frac{2}{3}$ of the melting point of said first metal and lower than the solidifying temperature of said first metal.

* * * * *